United States Patent [19]

Sugisawa et al.

[11] Patent Number: 4,578,274

[45] Date of Patent: Mar. 25, 1986

[54] PROCESS FOR PREPARING GRANULAR FOOD PRODUCTS

[75] Inventors: Ko Sugisawa, Nara; Masaru Shibuki, Kyoto; Imayoshi Imada, Nara; Jun Katada, Nishinomiya; Yozo Yamamoto, Osaka; Setsuo Nakajima, Osaka; Toshio Kishi, Osaka; Shozo Sugano, Osaka, all of Japan

[73] Assignee: House Food Industrial Co., Ltd., Tokyo, Japan

[21] Appl. No.: 596,774

[22] Filed: Apr. 4, 1984

[30] Foreign Application Priority Data

Jan. 10, 1984 [JP] Japan .................................. 59-1358

[51] Int. Cl.⁴ .............................................. A23L 1/216
[52] U.S. Cl. ...................................... 426/96; 426/99; 426/285; 426/453; 426/589; 426/638; 426/650
[58] Field of Search ................... 426/96, 99, 285, 453, 426/589, 638, 650

[56] References Cited

U.S. PATENT DOCUMENTS

| | | | |
|---|---|---|---|
| 3,245,805 | 4/1966 | O'Neil | 426/99 |
| 3,389,000 | 6/1968 | Fujita | 426/99 |
| 3,431,112 | 3/1969 | Durst | 426/285 |
| 3,433,650 | 3/1969 | Block | 426/99 |
| 3,492,128 | 1/1970 | Brennan et al. | 99/95 |
| 3,508,929 | 4/1970 | Callaghan | 426/453 |
| 3,647,480 | 3/1972 | Cermak | 426/453 |
| 3,652,299 | 3/1972 | Penton | 426/99 |
| 3,796,814 | 3/1974 | Cermak | 426/285 |
| 3,987,207 | 10/1976 | Spaeti | 426/285 |
| 3,992,555 | 11/1976 | Kovacs | 426/99 |

*Primary Examiner*—Jeanette M. Hunter
*Attorney, Agent, or Firm*—Armstrong, Nikaido, Marmelstein & Kubovcik

[57] ABSTRACT

A process for preparing granular food products which essentially comprises the steps of admixing solid fat having a melting point from 30 to 130° C. and at least one food material powder to provide a mixture, heating the mixture to prepare an intermediate paste product, flaking the paste product, adding additives to the paste product, heating the resulting product under agitation to prepare a granular food product and cooling the granular product to obtain a final granular food product.

12 Claims, No Drawings

PROCESS FOR PREPARING GRANULAR FOOD PRODUCTS

BACKGROUND OF THE INVENTION

This invention relates to a process for preparing granular food products and, more particularly, to a process for preparing granular food products having improved fluidity and solubility from at least one member selected from various food material powders represented by fragrant and pungent powders such as curry and pepper powders, cereal powders such as wheat flour and the like, and food material powders of fat and oil-containing foods represented by curry soup, stew, corn soup and potage soup.

As conventional processes for granulating food material powders, a varity of granulation processes such as fluid bed, extruding and spraying granulation processes have been known. These granulation processes have been generally referred to as the so-called wet granulation process and the wet granulation process requires hydrating, granulating and drying steps. That is, in the wet granulation process, it is required that after materials have been hydrated and then granulated, the moisture obtained in the granules evaporates. As a result, the wet process requires an additional step of drying granules. However, when the moisture in the granules is evaporated in the drying step, there is the disadvantage that the fragrant components also are volatized from the granules simultaneously with the vaporization of the moisture from the granules or the granules tend to become substantially hard due to moisture evaporation resulting in granules which do not promptly and easily dissolve in boiling water.

In order to eliminate the disadvantage, it has been found that the granulation process which does not require the hydrating step or the granulation and which is generally referred to as the dry granulation process is advantageous.

As the dry granulation process, the process in which fat and oil in a molten state are sprayed over food material powder to be granulated has been known. In the process it is required to melt fat and oil and then spray the fat and oil maintained in the molten state over the powder to be granulated and thus, the process has the disadvantages that special devices such as fat and oil heating and spray devices are required, that the sprayed fat and oil have to uniformly contact the powder to be granulated, that the uniform contact between the fat and oil and powder is in practice difficult and that the obtained granules tend to have a wide particle size distribution and as a result, particle size adjustment is difficult.

According to another known dry granulation process, binder having a high melting point such as a solid fat is previously heat-melted, powder to be granulated is added to the molten binder, the binder and powder are heated under agitation to prepare a mixture and the mixture is cooled. However, the dry process also has the disadvantage that uniform dispersion of the powder throughout the binder cannot be easily attained and as a result, the particle size distribution in the obtained granulated product becomes wider than that in the granulated product obtainable by the first-mentioned dry process to the degree tht the particle size adjustment is rendered difficult and in an extreme case, some portion of the powder remains ungranulated resulting in substantial diminution of granulation efficiency.

SUMMARY OF THE INVENTION

In order to overcome the disadvantages inherent in the conventional granulation processes referred to hereinabove, the inventors have engaged in the study of the granulation processes and more particularly, of the dry granulation processes. As a result of the inventors' study, it has been found that the disadvantages of the conventional granulation processes can be eliminated by admixing powder to be granulated and powdery binder having a particular melting point and heating and then cooling the mixture. After the inventors have devoted further deep study of the granulation processes, they have found out an improved granulation process. In the improved process, in order to granulate powder, flaked solid fat or flake-containing solid fat is employed as the binder in place of the above-mentioned powdery binder having a particular melting point to obtain substantially the same granulated product as that obtainable by the use of the powdery fat binder. It has been also found that the improved granulation process is most suitable for obtaining granulated fat and oil-containing foods which include powdery food materials for curry and stew which require cooking by pre-heating such as wheat flour and the like, for example.

The improved granulation process is embodied as a process for producing granular foods which essentially comprises the steps of admixing at least one food material powder and binder having a melting point from 30° to 130° C. to provide a mixture, heating the mixture to a temperature above the melting point of the binder under agitation and then cooling the mixture to a temperature below the melting point of the binder.

According to one aspect of the present invention, there has been provided a process for preparing a granular food product which essentially comprises the steps of heat-melting 40 weight parts of beef tallow having the melting point of 53° C. to provide a melt, adding 40 weight parts of wheat flour and 20 weight parts of curry powder to said melt to provide a mixture, heating said mixture to provide curry paste, flaking said curry paste to provide a flaked product, adding 10 weight parts of common salt, 20 weight parts of sugar, 20 weight parts of α-stach, 5 weight parts of chemical seasoning, 15 weight parts of natural extract and 5 weight parts of vegetable extract to 25 weight parts of said flaked product, heating the resulting mixture under agitation to provide a granular product and cooling said granular product to obtain a granular curry product.

According to another aspect of the present invention, there has been provided a process for preparing a granular food product which essentially comprises the steps of admixing 87 weight parts of curry powder and 13 weight parts of solid fat powder having the melting point of 60° C. under agitation to provide a mixture, heating said mixture under agitation, allowing said mixture to cool and screening said mixture to obtain a granular curry product.

According to a further aspect of the present invention, there has been provided a process for preparing a granular food product which essentially comprises the steps of admixing 85 weight parts of black pepper and 15 weight parts of maltose having the melting point of 110° C. under agitation to provide a mixture, heating said mixture under agitation and cooling said mixture under agitation to obtain granular black pepper.

According to a further aspect of the present invention, there has been provided a process for preparing a granular product which essentially comprises the steps of admixing 82 weight parts of wheat flour and 18 weight parts of solid fat powder having the melting point of 40° C. to provide a mixture, heating said mixture under agitation and cooling said mixture to obtain granular wheat flour.

PREFERRED EMBODIMENTS OF THE INVENTION

The present invention will be now be described in detail by way of embodiments thereof.

According to the basic conception of the present invention, at least one food material powder and binder having a melting point within the above-mentioned temperature range are admixed to provide a mixture and the mixture is then heated to a temperature above the melting point of the binder to assume a molten state. Thus the food material powder present about the molten binder adheres to the binder to form a number of small masses about the binder. Thereafter, when the masses are cooled to a temperature below the melting point of the binder, the molten binder solidifies resulting in the solidification of the small masses to thereby obtain a granular food product.

Therefore, the food material powder to be granulated by the process according to the present invention should be those which themselves do not melt at temperatures below the melting point of the binder used. Provided that the requirement is satisfied with, sample food material powder or combinations of different food material powders may be employed.

Food material powders useful in the process of the present invention include fragrant and pungent food material powders represented by curry, pepper and garlic powders, food material powders of fat and oil containing foods represented by curry, stew, corn soup and potage soup and powders of natural seasonings such as animal and vegetable extracts, amino acid seasoning such as sodium glutamate and acid seasoning such as sodium inosinate. In addition, there are powders of bakery foods such as cake mixtures, cookies and cream puffs.

Binders useful in the process according to the present invention are those having melting points from 30° to 130° C. The lower limit of the melting point of the binder is determined from the consideration for preventing the binder from melting at temperatures below room temperature and the upper limit of the melting point is determined from the consideration for preventing the heating temperature required for melting the binder from acting adversely on food material powder (deterioration of the quality of the granular food product caused by heating). Binders having melting points from 30° to 130° C. include solid fats such as beef tallow, lard, hardened palm oil and powdery fats and oils, waxes such as spermaceti, palm wax and beeswax, sugars such as maltose and the like, emulsifying agents such as glycerin monopalmitic acid ester and glycerine monostearic acid ester and powdery cheese. However, when food material powder is to be granulated, binder having a suitable melting point is selected from the class of binders referred to hereinabove depending upon the nature, application, heat stability and melting point of the food material powder with which the binder is mixed. As to the state of the binder when used, it is important that the binder maintains its solid state such as powdery, granular of flaky state. In order to attain the effects of the present invention in the most effective way with the above-mentioned considerations in mind, it is most preferable that solid fat used is in powdery, granular or flaky state as the binder. In this case, solid fat binder having a melting point from 30°–75° C. is preferably used. When solid fat having a melting point below the lower limit of the melting point temperature range referred to hereinabove, after the granulation of food material powder, the solid fat tends to melt due to external temperature or atmospheric air and is not capable of maintaining the obtained granular food product in granulated state. On the other hand, solid fat having a melting point above the upper limit of the melting point temperature range, when eaten, the obtained granular food product gives rough feel to the mouth. Solid fat in powdery, granular or flaky state can be produced in the conventional manner. As one example, sugar containing moisture in an amount from 1–20% by weight based on the total weight of the sugar is heated to a temperature from 100° to 140° C. to obtain a porous intermediate product and solid fat in molten state is added to the intermediate product to be absorbed therein to produce powdery solid fat (see U.S. Pat. No. 4,382,967) and in another example, solid fat is heat-melted and the molten fat is then flaked in a drum flaker to obtain flaked solid fat.

When solid fat is flaked in the above-mentioned procedure, a portion of the food material powder, such as a food material powder to be cooked by heating, for example, is added to the solid fat after the fat has been melted or while it is being melted and the mixture may be flaked after the mixture has been subjected to necessary heat-cooking. The procedure is most suitable for producing granular food products containing food material powder such as wheat flour or which must be be cooked by heating such as curry or stew, or food material powders containing a component or components which are not required to be cooked by heating such as sugar, common salt or α-starch.

Next, the dry granulation process for food material powder by the use of binder will be described.

According to the present invention, first of all, food material powder and binder having a melting point from 30° to 130° C. are admixed to provide a mixture. The mixing is to uniformly disperse the food material powder throughout the binder. Thus, at the mixing step, the binder is required to maintain its solid state and for that purpose, the mixing should be conducted at a temperature below the melting point of the binder used.

The mixing ratio of food material powder and binder affects the particle size of the final granular product and the greater the amount of the binder present, the larger the particle size is, and the smaller the amount of the binder is, the smaller the particle size is. Thus, the mixing ratio of food mateiral powder and binder may be optionally determined based on the particle size of a desired or final granular food product. According to the present invention, 50–97 weight parts of food material powder and 50–3 weight parts of binder are preferably mixed together.

After the two components have been admixed, the obtained mixture is subjected to heat treatment. In order to attain the object of the present invention, it is important that the mixture is heat-treated at a temperature above the melting point of the binder used. That is, during the heat treatment, the binder melts gradually and the food material present about the binder adheres to the molten binder to form a number of small masses.

The heat treatment may be conducted by the stationary heat treatment or stirring heat treatment, but the stirring heat treatment is most preferable because the treatment produces small masses of more uniform particle size. The heat treatment referred to herein may be direct or indirect heating, but in each case, the heating should be dry heating.

For the purpose, a mixture of food material powder and binder is placed into a jacketed kettle having agitation blades or a rotary agitator having a jacket without agitation blades, hot oil, vapor or hot water is introduced into the jacket as heating medium supplied from an external source, applying infrared rays or microwaves to the jacket to heat the mixture or alternatively, the mixture is heated by hot air while the mixture is flowing through a flow of air (fluidized bed).

After the heat treatment, the obtained small masses are cooled. The cooling of the small masses solidifies the molten binder and small masses whereby the food material powder turns to a substantially granular form. Thus, the above-mentioned cooling should be conducted to reduce the temperature of the mixture to a temperature below the melting point of the binder used. As mentioned hereinabove, although the cooling may be conducted stationarily or under agitation, when the cooling is conducted stationarily, the granules tend to coagulate to form a block and the particle size of the granules should be adjusted later. However, since the block is a brittle mass, the block breaks up easily into individual granules when subjected to quite weak external forces. Cooling can be conducted by supplying coolant such as cold water, nitrogen gas or carbonic acid gas to the above-mentioned jacket to forcibly cool the granules, causing cold air or any one of the above-mentioned coolants to directly contact the granules to forcibly cool the granules or allowing the granules to cool of themselves at room temperature. However, the first mentioned forcible cooling is most preferable from the consideration of cooling efficiency. After the cooling, the granules are then transferred to a screening step as the case may be.

The thus obtained granules have a relatively narrow particle size distribution and an excellent fluidity. In order to obtain the granules characterized by the above-mentioned properties, the granulation process of the present invention can be quite simply conducted by admixing food material powder and binder having a particular melting point to provide a mixture, heating and cooling the granules under specific conditions. Thus, the granulation process of the present invention does not require maintaining fat and oil of high melting point in molten state and spraying the same and accordingly, the process of the invention does not require a fat and oil heating device and a fat and oil spraying device at all. And according to the granulation process of the present invention, there is the advantage that the particle size of the granules can be quite easily adjusted by merely regulating the amount of binder to be used.

The granulation process of the present invention having the above-mentioned advantages is suitable for granulating various food material powders and also for granulating simple flavor and pungent powder such as pepper and flavor and pungent powder blend such as curry powder which themselves have no binding action and attach importance to fragrance.

Furthermore, the process of the present invention is most suitable for granulating various fat and oil-containing food material powders and more particularly, for powders of fat and oil-containing food materials such as curry, stew, corn soup, potage soup and the like. To describe above curry as one example, food material powders such as wheat flour and powder which requires cooking by heating and solid fat and oil are cooked by heating to provide curry paste and the paste is then flaked by the conventional procedure. The flakes are then fully mixed with sugar, common salt and α-starch which do not require heating, the mixture is heated and mixed together at a temperature above the melting point of the binder used under agitation and the obtained mixture is cooled to a temperature below the melting point of the binder used to thereby obtain curry granules.

According to the present invention, when solid fat or solid fat-containing flakes are obtained in the manner mentioned above, since the heating melts the solid fat and at the same time heat-cooks materials which require heat-cooking, the process of the invention is quite advantageous.

Furthermore, natural seasonings represented by animal and vegetable extracts and moisture-absorption foods and food materials such as aminoacetic acid seasonings and nucleic acid seasonings are granulated to thereby control the moisture absorption and improve the fluidity of the seasonings in foods or food materials.

When solid fat is used as the binder in the granulation process according to the present invention, the solid fat may incorporate one or more of various essential oil components melted therein within the scope of the invention.

However, solid fat in the form of powder is preferably used because the powdery solid fat binder is easy in the adjustment of the melting point and can positively hold the fragrant component of the food material powder with which the binder is mixed.

The present invention will be now described by way of specific examples which illustrate the granulation process of the invention, but do not limit the scope of the invention.

EXAMPLE 1

40 weight parts of beef tallow having the melting point of 53° C. and maintained at 25° C. was placed into a kettle with a jacket and an agitator and oil at high temperature was continously supplied to the jacket for 20 (twenty) minutes to heat the beef tallow to 80° C. at which the fat melted. 40 weight parts of wheat flour and 20 weight parts of curry powder were placed into the kettle to mix the food material powders with the beef tallow. The jacket was then heated at 120° C. for 10 (ten) minutes to cook the mixture into curry paste. The curry paste was transferred from the agitator into a drum flaker (drum clearance: about 2 mm and cooling water temperature: about 20° C.) and flaked (flakes had the thickness of about 1 mm and the dimensions of about 10 mm×10 mm). The flakes were removed from the drum flaker. 25 weight parts of flakes, 10 weight parts of common salt, 20 weight parts of sugar, 20 weight parts of α-starch, 5 weight parts of chemical seasoning, 15 weight parts of natural extract and 5 weight parts of vegetable extract were placed into a ccoker and admixer for 5 (five) minutes. The resulting mixture was transferred from the cooker into the above-mentioned agitator and heated at about 60° C. for 10 (ten) minutes under agitation to admix the components resulting in granules. The granules were removed from the agitator by passing air through the granules for about 7 (seven) minutes in a fluidized bed and then cooled to about 40° C. to obtain curry granules as the final food product which the process of the present invention intends to obtain.

CONTROL 40 weight parts of beef tallow having the melting point of 53° C. and maintained at 25° C. was placed into a kettle with a jacket and an agitator and oil at high temperature was continuously supplied to the jacket for 20 (twenty) minutes to heat the beef tallow to 80° C. at which the fat melted. The molten beef tallow, 40 weight parts of wheat flour and 20 weight parts of curry powder were placed into the cooker and cooked at 120° C. for 10 (ten) minutes to obtain an intermediate paste product. Thereafter, the additives described in connection with Example 1 were added to the intermediate paste product in the cooker and the contents in the cooker were cooked to obtain curry paste. The obtained curry paste was transferred from the cooker into the above-mentioned kettle and cooled by continuously supplying cold water at 10° C. to the jacket for 15 (fifteen) minutes under agitation to obtain curry granules.

The curry granules of Example 1 and the control curry granules were compared with each other for particle size distribution, angle of repose, appearance and solubility. The comparison results are shown in Tables 1, 2 and 3 given below.

The solubility of the curry granules was measured by placing 20 g each of the two types of curry granules into 300 ml of boiling water maintained at 97° C., holding the granules in the boiling water for 1 (one) minute and determining the weight of granules remained undissolved. The dissolving test was conducted in two different ways, that is, with an without agitation. The results are reported in Table 3.

TABLE 1

| Particle size distribution | Inventive | Control |
| --- | --- | --- |
| 16 mesh on | 22.1% | 11.4% |
| 24 mesh on | 7.6% | 5.9% |
| 32 mesh on | 15.5% | 13.4% |
| 42 mesh on | 20.9% | 16.6% |
| 42 mesh pass | 33.9% | 52.7% |

TABLE 2

| | Angle of repose | Appearance |
| --- | --- | --- |
| Inventive | 46° | Substantially dry |
| Control | 48° | Particles appear to adhere to each other |

TABLE 3

| Dissolving procedure | Inventive | Control |
| --- | --- | --- |
| With agitation | 4.0 g | 9.9 g |
| Without agitation | 0.0 g | 4.0 g |

As clear from Table 1, the Control granules include those passing through 42 mesh screen in the amount of 52.7% or in excess of one half of the total amount of granules under consideration whereas the Inventive granules include those passing through 42 mesh screen in the amount of 33.9% which is substantially less than that of those of the Control granules. From this, it can be said that the process by the present invention produces granules having a relatively narrow particle size distribution including a smaller amount of fine particles. Next, from Table 2, it is seen that the Inventive granules are superior to the control granules with respect to angle of repose and appearance. In addition, the solubility of the Inventive granules is over twice as great as that of the Control granules.

EXAMPLE 2

87 weight parts of curry powder and 13 weight parts of solid fat powder (that obtained by heat-melting solid fat and spray-drying the melt) were placed into a kettle with a jacket and an agitator and admixed uniformly under agitation. Vapor is then continuously supplied to the jacket for 15 (fifteen) minutes to heat the contents in the kettle from about 25° C. to about 70° C. under agitation and the kettle contents are left as they are at the temperature of 25° C. for 24 (twenty-four) hours until the contents cooled to room temperature followed by screening to thereby obtain granular curry product. The obtained granular curry product had an excellent fluidity, maintained its substantially original fragrance prior to granulation and exhibited a palatable taste superior to that of the curry power prior to granulation.

EXAMPLE 4

82 weight parts of wheat flour and 18 weight parts of solid fat powder (that obtained by heat-melting solid fat and spray-drying the melt) were placed into an agitator with a jacket and uniformly admixed under agitation. Vapor is then supplied to the jacket to heat the mixture from about 25° C. to about 60° C. for 10 (ten) minutes. The mixture was then cooled to room temperature under agitation to obtain a granular wheat flour product. The obtained granular wheat flour product showed an excellent fluidity.

While preferable embodiments of the invention have been described in detail, it will be understood that the same are for illustration purpose only and not to be taken as a definition of the invention, reference being had for this purpose to the appended claims.

What is claimed is:

1. A process for preparing a granular food product comprising the steps of:
    (a) thorough admixing by continuous agitation one or more food material powders and a binder having a melting point in the range of 30° to 130° C. and selected from the group consisting of (1) the solid fat group consisting of beef tallow, lard, hardened palm oil, corn oil, bean oil, rape seed oil, and salad oil, (2) the wax group consisting of spermaceti, palm wax and beeswax and (3) sugar such as maltose in a mixing ratio in the range of 50-97 to 50-3 by weight percent of said food material powder to said binder at a temperatre below the melting point of the binder:
    (b) dry-heating the mixture to a temperature above the melting point of the binder under continuous agitation to render the binder into a molten state to thereby bind the food material powder and binder, and;
    (c) cooling said mixture mixture to a temperature below the melting point of the binder under continuous agitation or in a flow condition so as to granulate the mixture while solidifying the bond between the food material powder binder.

2. The process for preparing a granular food product as set forth in claim 1, in which said binder is in a form selected from powdery, granular and flaked forms.

3. The process for preparing a granular food product as set forth in claim 1, in which said binder is solid fat.

4. The process for preparing a granular food product as set forth in claim 3, in which said melting point of the solid fat is from 30° to 75° C.

5. The process for preparing a granular food product as set forth in claim 1, in which said food material powder is at least one member selected from fragrant and pungent material powders including powders of curry, pepper and garlic powders and of cereals including wheat flour.

6. The process for preparing a granular food product as set forth in claim 1, in which said food material powder is at least one member selected from food material powders for cookable foods including curry, stew, corn soup and potage soup.

7. The process for preparing a granular food product as set forth in claim 1, in which said food material powder is a member selected from the group consisting of natural seasonings including powders of animal and vegetable extracts, of amino acid seasonings including sodium glutamic acids and of nucleic acid seasonings including sodium inosinic acid.

8. The process for preparing a granular food product as set forth in claim 1, in which said food material powder is a member selected from the group consisting of powders of bakery foods including cake mixtures, cookies and cream puffs.

9. The process for preparing a granular food product according to claim 1 wherein are admixed 87 weight parts of curry powder and 13 weight parts of a solid fat powder having a melting point of 60° C.

10. A process for preparing granular food product according to claim 1 wherein are admixed 85 weight parts of black pepper and 15 weight parts of maltose having the melting point of 110° C.

11. A process for preparing a granular food product according to claim 1 wherein are admixed 82 weight parts of wheat flour and 15 weight parts of a solid fat powder having the melting point of 40° C.

12. A process for preparing a granular food product comprising the steps of heat-melting 40 weight parts of beef tallow having the melting point of 53° C. to provide a melt, adding 40 weight parts of wheat flour and 20 weight parts of curry powder to said melt to provide a mixture, heating said mixture to provide curry paste, flaking said curry paste to provide a flaked product, adding 10 weight parts of commom salt, 20 weight parts of sugar, 20 weight parts of α-starch, 5 weight parts of chemical seasoning, 15 weight parts of natural extract and 5 weight parts of vegetable extract to 25 weight parts of said flaked product, heating the resulting mixture under agitation to provide a granular product and cooling said granular product to obtain a granular curry product.

* * * * *